(12) United States Patent
Chandler et al.

(10) Patent No.: US 7,342,081 B2
(45) Date of Patent: Mar. 11, 2008

(54) FLUOROPOLYMER COMPOSITIONS, COATED ARTICLES, AND METHOD OF MAKING THE SAME

(75) Inventors: Blake E. Chandler, Woodbury, MN (US); Thomas J. Blong, Woodbury, MN (US); Dale E. Hutchens, Huntsville, AL (US)

(73) Assignee: 3M Innovative Properties Company, St. Paul, MN (US)

( * ) Notice: Subject to any disclaimer, the term of this patent is extended or adjusted under 35 U.S.C. 154(b) by 232 days.

(21) Appl. No.: 11/024,131

(22) Filed: Dec. 28, 2004

(65) Prior Publication Data

US 2006/0142514 A1    Jun. 29, 2006

(51) Int. Cl.
*C08F 16/24* (2006.01)

(52) U.S. Cl. ........................ 526/247; 526/250

(58) Field of Classification Search ................ 526/247, 526/250
See application file for complete search history.

(56) References Cited

U.S. PATENT DOCUMENTS

| | | | |
|---|---|---|---|
| 3,640,984 A | 2/1972 | Miller | |
| 4,038,230 A | 7/1977 | Mueller et al. | |
| 4,312,961 A | 1/1982 | Winegar et al. | |
| 4,675,380 A | 6/1987 | Buckmaster et al. | |
| 4,687,708 A * | 8/1987 | Batzar | 428/339 |
| 4,714,756 A * | 12/1987 | Buckmaster | 528/481 |
| 4,742,122 A | 5/1988 | Buckmaster et al. | |
| 4,743,658 A * | 5/1988 | Imbalzano et al. | 525/326.4 |
| 4,898,779 A | 2/1990 | Yoshimura et al. | |
| 4,914,158 A | 4/1990 | Yoshimura et al. | |
| 4,977,221 A | 12/1990 | Yoshimura et al. | |
| 5,115,038 A | 5/1992 | Ihara et al. | |
| 6,476,120 B1 | 11/2002 | Bowers | |
| 6,693,164 B2 * | 2/2004 | Blong et al. | 528/480 |
| 7,037,352 B2 * | 5/2006 | Ito et al. | 51/307 |
| 2004/0132914 A1 | 7/2004 | Nakatani et al. | |

FOREIGN PATENT DOCUMENTS

| | | |
|---|---|---|
| CA | 1 248 292 | 1/1989 |
| EP | 224037 A2 * | 6/1987 |
| EP | 0 272 659 B1 | 6/1988 |
| EP | 0 896 017 A1 | 2/1999 |
| GB | 1 210 794 | 10/1970 |

* cited by examiner

*Primary Examiner*—David W. Wu
*Assistant Examiner*—Henry S. Hu
(74) *Attorney, Agent, or Firm*—Brian E. Szymanski

(57) ABSTRACT

A fluoropolymer composition comprising a fluoropolymer with a particle size distribution having a ratio of the mode to D95 of 0.75 or greater and wherein when the fluoropolymer is a copolymer consisting of interpolymerized units derived from tetrafluoroethylene and perfluoro(propyl vinyl) ether, the fluoropolymer has less than 60 unstable endgroups per million carbon atoms; coated articles comprising the fluoropolymer; and methods for making the same.

10 Claims, No Drawings

FLUOROPOLYMER COMPOSITIONS, COATED ARTICLES, AND METHOD OF MAKING THE SAME

FIELD OF THE INVENTION

The present invention relates to fluoropolymer compositions and a method making the same, and more particularly to fluoropolymers capable of providing smooth coatings, good fluidization, good release characteristics, and good electrostatic properties. In another aspect, the present invention relates to coated articles comprising fluoropolymer compositions.

BACKGROUND OF THE INVENTION

Certain fluorine containing polymers (also referred to as "fluoropolymers") are known to have desirable properties such as good chemical resistance, excellent release, good heat resistance and electrical insulation. The excellent release properties have lead to fluoropolymers, particularly fluoropolymer powders that are melt-flowable, to be useful in coating food preparation articles such as, for instance, fry pans, rice cookers, grills, and bakeware. Fluoropolymers have also found use in numerous industrial applications such as fuser rolls or belts for copiers and printers, vessels, and chemical processing reactors.

Fluoropolymers may be coated onto substrates by a number of conventional methods, for instance, by dispersion coating or by powder coating. When powder coating a substrate, powder particle size distribution can influence the powder delivery system, the charging system and the final film characteristics. For feed hopper delivery, steady, uniform fluidization of the powder is required to achieve a consistent flow through the pumps and out the spray device. If the concentration of fine particles is too high, powder coating material tends to clump together and resist fluidization. Higher air pressure may alleviate some of the clumping, but this can cause geysering in the fluidization bed. By geysering is meant when the surface of the fluidized powder becomes inconsistent with large eruptions from the bed surface and dead spots. This condition may cause air to surge and deliver inconsistent amounts of powder to the spray device. This may result in inconsistent film thickness and possibly surface blemishes. If severe, the spray device may spit a large volume of powder onto the surface and leave a blotchy mound of powder. The higher moisture content of powders with high concentrations of fine particles may contribute to additional clumping.

Particle size can also influence the charging system, that is, particle size may affect the electrostatics of powder delivery. Back-ionization related to fine particles can contribute to surface disruptions at thinner films. Larger particles, on the other hand, are more likely to have straight line motion and be affected only by strong electrostatic force lines. These properties can affect the transfer efficiency of a powder coating.

Film characteristics, such as thickness and smoothness, are also affected by particle size. In general, coarser powders (larger particle size) will build thicker films, while finer powders (smaller particle size) will provide thinner films. Large particles, particularly those with high molecular weight, take longer to melt and flow and may not completely level out during processing, leading to rough surfaces. If the powder is too coarse, it may cause excessive texture called "orange peel." An excess of fines, on the other hand, may cause a film to reach the self-limiting point faster and start back ionization, resulting in "electrostatic orange peel."

SUMMARY OF THE INVENTION

The present invention recognizes that a need exists for powder coatings, in particular fluoropolymer powder coatings that provide good deposition properties. Good deposition properties include, for example, improving one or more of fluidization of a fluoropolymer, electrostatic properties in electrostatic powder deposition, and smoothness of coated articles.

In one aspect of the invention, a method for making a fluoropolymer powder is provided. The method comprises classifying the coarse fraction of a first fluoropolymer to give a second fluoropolymer with a fluoropolymer particle size distribution having a ratio of the mode to D95 of 0.75 or greater. When the second fluoropolymer is a copolymer consisting of interpolymerized units derived from tetrafluoroethylene and perfluoro(propyl vinyl) ether, the method further comprises reducing the number of endgroups of the fluoropolymer to less than 60 unstable endgroups per million carbon atoms.

In another aspect, the present invention relates to a fluoropolymer powder comprising a fluoropolymer with a particle size distribution having a ratio of the mode to D95 of 0.75 or greater. When the fluoropolymer is a copolymer consisting of interpolymerized units derived from tetrafluoroethylene and perfluoro(propyl vinyl) ether, it has less than 60 unstable endgroups per million carbon atoms.

In another aspect, the present invention relates to a coated article comprising a fluoropolymer with a particle size distribution having a ratio of the mode to D95 of 0.75 or greater. The fluoropolymer forms a layer on a substrate. When the fluoropolymer is a copolymer consisting of interpolymerized units derived from tetrafluoroethylene and perfluoro(propyl vinyl) ether, it has less than 60 unstable endgroups per million carbon atoms. The coating may have a roughness, measured as an $R_a$, of 3 microns or less.

In yet another preferred aspect, the fluoropolymer of the present invention has a mode of 30 to 70 microns and is substantially free of particles larger than about 75 microns. Additionally the fluoropolymer has less than 60 unstable endgroups per million carbon atoms when the fluoropolymer is a copolymer consisting of interpolymerized units derived from tetrafluoroethylene and perfluoro(propyl vinyl) ether.

DEFINITIONS

For purposes of the present invention, the following terms utilized in this application are defined as follows:

"Fine particles" means particles less than 10 microns;

Coarse particles" means particles greater than the 65% percentile of the distribution;

"D50" means 50% of the particles as measured by volume % are smaller than the corresponding diameter in microns;

"Volume percent particle size" means equivalent spherical particle diameter as measured by a particle size analyzer in volume mode at D50 (e.g. Coulter Counter or Light Scattering);

"D95" means 95% of the particles as measured by a volume percent electrozone sensing method(e.g. Coulter Counter) are smaller than the corresponding diameter in microns;

"Mode" means the peak of the particle size distribution as measured by a volume percent electrozone sensing method (e.g. Coulter Counter);

The average roughness "$R_a$" comprises the area between the roughness profile and its mean line, or the integral of the absolute value of the roughness profile height over the evaluation length and is represented by the following equation:

$$R_a = \frac{1}{L}\int_0^L |r(x)|dx;$$

"substantially free" means that the number of particles larger than about 75 microns comprises less than 0.1 percent of the total number of particles in the particle size distribution as measured by a Hosakawa Micron jet sieve;

"unstable end groups" means reactively unstable moieties at the end of a polymer chain that have a tendency to cause bubbles or voids when coatings are formed, such as, for example, —$CF_2CH_2OH$, —$CONH_2$, —$COOX$ (where X is H or other cation), vinyl or —$COF$; and "essentially free" means less than 5 unstable endgroups per million carbon atoms.

DETAILED DESCRIPTION OF THE INVENTION

In one aspect, the present invention provides a method for making a fluoropolymer powder. The method comprises classifying a first fluoropolymer to give a second fluoropolymer with a fluoropolymer particle size distribution having a ratio of the mode to D95 of 0.75 or greater. When the second fluoropolymer is a copolymer consisting of interpolymerized units derived from tetrafluoroethylene and perfluoro (propyl vinyl) ether, then the method further includes reducing the number of unstable endgroups of the fluoropolymer to less than 60 unstable endgroups per million carbon atoms. Also, unless otherwise specified, "classify", "classifying", "classified", and the like refer to separating particles of different sizes according to a desired specification.

Fluoropolymers useful in the present invention include fluoropolymer powders such as those having interpolymerized units of one or more fluorinated or perfluorinated comonomers such as tetrafluoroethylene (TFE), hexafluoropropylene (HFP), vinylidene fluorine, fluorovinyl ethers, perfluorovinyl ethers, as well as combinations of one or more of these with one or more non-fluorinated comonomers such as, for example, ethylene, propylene or other lower olefins. The fluoropolymer may be either partially fluorinated of fully fluorinated. In another aspect, useful fluoropolymers include those commercially available under the designations THV (described as a copolymer of tetrafluoroethylene, hexafluoropropylene, and vinylidene fluoride), FEP (a copolymer of tetrafluoroethylene and hexafluoropropylene), PFA (a copolymer of tetrafluoroethylene and perfluorovinyl ether), HTE (a copolymer of tetrafluoroethylene, hexafluoropropylene, and ethylene), ETFE (a copolymer of tetrafluoroethylene and ethylene), and PVDF (polyvinylidene fluoride), as well as combinations thereof. Any of the aforementioned materials may further contain interpolymerized units of additional monomers. Combinations of two or more fluoropolymers may also be used. Preferably, the primary fluoropolymer component of the present invention is a melt-processable polymer, such as those comprising TFE copolymers.

The fluoropolymers of the present invention may be synthesized by any of a variety of means available in the art, including, for example, emulsion and suspension polymerization. Emulsion polymerization is particularly useful in synthesizing PFA, FEP, ETFE, HTE, and THV. PVDF may be synthesized, for instance, by suspension polymerization. These fluoropolymers may have a melt flow index of from 0.1 to 50, preferably from about 1 to 20, more preferably from about 2 to 8. Those skilled in the art recognize that the conditions and parameters for determining melt flow index may vary for a given type of fluoropolymer conditions and parameters for determining melt flow index are generally stated in ASTM D1238.

The fluoropolymers of the present invention may contain less than 60 unstable endgroups per million carbon atoms, more preferably less than 20 unstable endgroups per million carbon atoms, and most preferably the fluoropolymers are essentially free of unstable endgroups. Fluorination may be carried out with a variety of fluorine radical generating compounds, but preferably the polymer is contacted with fluorine gas either prior to or after classification. Such gas is usually diluted with an inert gas such as nitrogen, due to the exothermicity of the reactions with fluorine. Typically, the level of fluorine in the fluorine/inert gas mixture may be in the range of 1 to 100 volume %, but is preferably 10 to 25 volume %. The temperature may be between 100° C. and 250° C. The fluorination time may be between 1 to 20 hours, preferably 8 to 12 hours. Also, it is preferred to maximize the surface area of the polymer exposed to the fluorine gas mixture, for example, by agitating the polymer. Gas pressure may range from 1 to about 10 atmospheres but preferably ambient pressure is used. The unstable endgroups are converted to more stable -$CF_3$ end groups. After exposure to the fluorination conditions, the polymer may be subjected to a flow of inert gas, such as nitrogen.

The utilization of fluorinated initiators or partial fluorinated chain transfer agents represent other conventionally accepted methods to achieve fluorination of the composition.

In another aspect, the present invention relates to a powder comprising a fluoropolymer with a particle size distribution having a ratio of the mode to D95 of 0.75 or greater, wherein the fluoropolymer has less than 60 unstable endgroups per million carbon atoms when the fluoropolymer is a copolymer consisting of interpolymerized units derived from tetrafluoroethylene and perfluoro(propyl vinyl) ether. Preferably the mode to D95 ratio is 0.80 or greater or most preferably 0.85 or greater. This powder may be produced by comminuting the first fluoropolymer coarser than desired for the finished distribution. Next, the first fluoropolymer is then classified through a sieve to remove coarse particles. In the classification, the first fluoropolymer may also be classified to remove fine particles. An air jet technology may be used to prevent screen blinding of the screen. This can give a second fluoropolymer that has a particle size distribution having no large particles. In some embodiments, the classification can remove all particles larger than, for example, 75 microns. Classification may also remove a desired percentage of the coarse fluoropolymer in a given fluoropolymer distribution. Additionally, the fines are minimized due to the coarser comminution.

In the present invention, it is found that a particle size distribution having a mode to D95 ratio of 0.75 or greater gives good particle flow and fluidization properties. Furthermore, when applied to a surface, a fluoropolymer having a particle size distribution having a mode to D95 ratio of 0.75 or greater gives a smoother coating than many fluoropolymer powders known in the art. In one aspect, fluoropolymer particles described in the present invention have had less than 3 percent of the fine particles removed, preferably none of the fine particles have been removed. Further, the coarse particles classified in the present invention may be efficiently utilized by recomminuting them.

In yet another aspect, the present invention relates to a coated article comprising a substrate and a fluoropolymer coating. The fluoropolymer coating is derived from the application of the fluoropolymer powder having a particle size distribution prior to application onto the substrate having a ratio of the mode to D95 of 0.75 or greater. The fluoropolymer has less than 60 unstable endgroups per million carbon atoms when the fluoropolymer is a copolymer consisting of interpolymerized units derived from tetrafluoroethylene and perfluoro(propyl vinyl) ether. Preferably the coated article has a surface roughness as measured by $R_a$ of 3 microns or less. A fluoropolymer composition of the present invention may have a volume percent particle size of less than 100 microns, preferably less than 75 microns, most preferably less than 65 microns. In a preferred embodiment, the fluoropolymer has, a mode of 30 to 70 microns, and is substantially free of particles larger than about 75 microns. Additionally, the fluoropolymer composition has less than 60 unstable endgroups per million carbon atoms when the fluoropolymer is a copolymer consisting of interpolymerized units derived from tetrafluoroethylene and perfluoro(propyl vinyl) ether.

The powder is applied by conventional powder coating techniques. Non-limiting examples of powder coating techniques include electrostatic spray coating and fluidized bed coating. Electrostatic powder spray coating is preferred. Those skilled in the art are capable of selecting appropriate coating techniques to achieve desired results.

After application by powder coating further processing by heat at a temperature above the melt temperature of the fluoropolymer is used to fuse and coalesce the powder particles into a coating. Selection of a specific time and temperature to fuse and coalesce the powder particles will depend upon the selected fluoropolymer, the selected substrate and the applied coating thickness. Those skilled in the art are capable of determining the appropriate temperatures and times.

Substrates useful in the present invention are not particularly limited. For example, suitable substrates include glass, ceramics, metals, such as, for instance, aluminium, steel and stainless steel, copper, zinc, and alloys thereof. The substrates may also include thermoset or thermoplastic polymeric materials. The fluoropolymer powders may be coated onto the substrate by any conventionally recognized method. A preferred method for coating substrates with the fluoropolymers described herein is electrostatic spray powder coating. In addition, the fluoropolymer may be fused via heat fusing, creating a bond to the substrate and/or an intervening binder or primer layer. By heat fusing is meant heating a powder coating at a temperature and for a time sufficient for the powder to coalesce to form a film on the substrate.

Coated substrates of the present invention provide improved properties over those of the prior art. For instance, the coated substrates of the present invention are smoother than substrates coated with a fluoropolymer coating having a similar chemical composition and average particle size but a particle size distribution different than the particle size distribution herein described. The compositions of the present invention melt and flow better than coarser powders and show excellent levelling out during processing, generally leading to smooth surfaces and reduced or eliminated "orange peel". Furthermore, coated substrates of the present invention provide excellent processability when applied with electrostatic powder coating techniques. The compositions of the present invention decrease self-limitation of the powder build prior to back ionization. As a result, coated substrates of the present invention exhibit reduced or eliminated "electrostatic orange peel." Furthermore, the fluoropolymers of the present invention, useful as coatings in the coated articles described herein, may be capable of providing better smoothness for thinner coatings, better electrostatic and better fluidization than fluoropolymers having a similar chemical composition and average particle size but a particle size distribution different than the particle size distribution herein described.

Conventional binders or primers useful in the present invention may be interposed between the substrate and the fluoropolymer. Binders or primers may be liquid or powder. Suitable binders include, for example phenolic compounds, polybenzimidazoles, polyimides, polyamide-imides, polythiazoles, polyhydroxy benzoic acids, polyphenylenes, polybenzoxazoles, polyoxadiazoles, polytriazoles, and polyethersulfones. Useful phenolic compounds have at least one aromatic ring, which ring has at least one hydroxyl group attached directly to it and at least one of the hydroxyl groups is capable of forming a phenolate salt. In one aspect, the phenolic compounds comprise polyhydroxy aromatic compounds. These polyhydroxy aromatic compounds may have a plurality of hydroxyl groups attached directly to the aromatic ring. Examples of suitable polyhydroxy aromatic compounds include resorcinol, pyrogallol, phloroglucinaol, catechol, 5-dihydroxynaphalene and 4,4'-dihydroxybiphenyl, hydroquinone, or a combination thereof.

Suitable primers may include binders and additional materials. The additional included with the binders are those conventionally recognized in the art. For example, blends of FEP, PFA and PTFE with hydrocarbon polymers are known to act as primers for PTFE and PFA coatings. When PTFE coatings are applied by dispersion coating, primers may also contain PFA, FEP, and blends thereof further comprising a binder, such as, for example, polyamide-imides.

The substrate surface may optionally be treated before application of binders, primers, or fluoropolymer. For instance, metal surfaces may be treated by any conventional methods known in the art, such as sandblasting, or treating the substrate with surface preparatory agents, such as, for instance, phosphates or chromates.

Binders and primers may be applied to substrates by any conventional method. Application methods include, for example, spray coating, powder coating, roll coating, Mayer rod coating, or dip coating.

Various embodiments of the present invention are useful in chemical storage tanks, exhaust duct coatings, biomedical devices, food preparation articles such as, for instance, fry pans, rice cookers, grills, and bakeware, electronic materials, and architectural coatings, to name a few.

Objects and advantages of the present invention are further illustrated by the following examples, but the particular materials and amounts thereof recited in these examples, as well as other conditions and details, should not be construed to unduly limit this invention.

EXAMPLES

Roughness Testing

Stylus Profilometry was carried out using a Veeco Dektak 8 stylus profiler (available from Veeco, Woodbury, N.Y.)

with the conditions as follows: Scan length; 20 mm; scan duration 30 seconds, stylus force 10 mg; stylus type was 0.2 micron radius diamond. The data was levelled (because of the non-flat steel plates). Otherwise the data was not altered. For each specimen 5 measurements were averaged and are reported. The roughness of each fluoropolymer powder was measured and is reported as $R_a$ in Table 2 below.

Electrostatics

The electrostatics were evaluated using a Nordson Sure Coat (trademark) powder spray gun (available from Nordson Corporation in Amherst, Ohio). The voltage was set at 40 KV. Powder is sprayed onto a 76 mm×152 mm panel with the gun tip held 200 mm away from the panel. Powder is sprayed until the onset of back ionization is observed then the panel is weighed. "Electrostatics" are reported in Table 2 as the amount of weight gain on a panel before back ionization is observed. Higher weight gain correlates to better electrostatic properties.

Fluidization 1000 grams of powder were placed in a Nordson H-1-4 hopper attached to a Nordson Sure Coat Manual Gun Control Unit (part #237 395D) and a Manual Powder Spray Gun (part #237 421E) available from Nordson Corporation in Amherst, Ohio. Air was set at 0.5 bar and the material is agitated to ensure complete fluidization. A timer is started and the material is observed. Notes are taken as transitions are observed and the fluidization is then evaluated according the following criteria. The fluid bed was observed for 5 minutes.

In Table 2, the following symbols will be used to indicate fluidization characteristics:

z,900 indicates a boiling fluid bed with only slight geysering around the perimeter of the fluid bed
z,901 indicates geysering in the bed but no channeling
z,902 indicates bed channels and falls Electrozone Analysis for Obtaining Skewness The analysis was carried out on a Coulter Multisizer II, available from Coulter Corporation, Fullerton Calif., USA with the following settings and conditions. The electrolyte used was Isoton II (available from Coulter Corp., Fullerton, Calif.). The dispersant was a blend of 25% FC4432 (available from 3M Company Saint Paul, Minn.) and 75% isopropyl alcohol. The aperture size was set at 140 μm (two tube analysis is required for distributions with particles larger than the detection limit of this tube). The aperture current applied was 800 μA. The KD was 1241, the gain was set at 4 and the total count was 100,000.

Sample Preparation was carried out as follows: Approximately 1.5 grams of powder was added to ~30 ml vial followed by 4 to 5 drops of surfactant. This was followed by approximately 20 mL of Isoton II. The vial was then placed into a sonic bath until the powder was fully dispersed. The analysis was then carried out as standard procedure to one skilled in the art.

Particle Size Analysis using Light Scattering

The particle size analysis was carried out on a Malvern Mastersizer/E (available from Malvern Instruments Ltd. Worcestershire, United Kingdom) with the following settings and conditions. The carrier used was octanol. The path length was set at 300 mm. The analysis was conducted at volume distribution and was model independent.

The reservoir was filled with octanol. The tank stirrer, pump and ultrasonics were then turned on and then a 30 second wait to get rid of bubbles. The background was set and the powder added to the reservoir until obscuration was about 0.2. Then the particle size was measured. As used herein and throughout, particle size refers to volume percent particle size.

The following Examples are summarized in Table 1, below.

TABLE 1

| Example | Description | Mill/ Classifier Speed (RPM) | Initial Mean Particle Size (μm) | Sieve Size (μm) | Sieved Mean Particle Size (μm) | Bulk Density |
|---|---|---|---|---|---|---|
| Comparative Example 1 | PFA T | 12,000/7000 | 32 | 250 | 32 | 85 |
| Example 1 | PFA T | 10,000/3500 | 51 | 53 | 41 | 89 |
| Example 2 | FEP | 17,000/4000 | 41 | 53 | 33 | 81 |
| Example 3 | ETFE | 17,000/5000 | 45 | 53 | 28 | 61 |
| Example 4 | PFA T | 12,000/4500 | 55 | 74 | 48 | 92 |
| Example 5 | PFA T | 13,000/5000 | 40 | 45 | 34 | 89 |

COMPARATIVE EXAMPLE 1

PFA 6502TA (available from Dyneon LLC Oakdale, Minn.) was mechanically compacted by placing 60 to 90 grams of PFA into a 7.62 cm diameter cylindrical compression mold. A compressive force of 670 kN was applied for 10 seconds to form a cylindrical disk (refer to U.S. Pat. No. 4,312,961). The disks were broken and fed into a Strand S104 Hammer mill, from Strand Manufacturing Inc. Hopkins, Minn., using s 4 mesh screen to obtain a coarse powder. The coarse powder was milled on a Hosokawa ACM1 mill from Hosokawa Micron, Summit, N.J. with the following settings. Airflow was set to 20 in $H_2O$ (4900 pascals) and mill speed to 12,000 RPM. The classifier speed was set to 7000 RPM.

The resulting powder was measured to have a volume percent particle size of 32 μm on a Malvern Mastersizer/E.

The powder was then sieved at 250 microns with a Hosokawa Micron Air Jet Sieve (available from Hosokawa Micron, Summit, N.J.). At this sieve size, essentially no particles were removed from the fluoropolymer, resulting in a polymer having a mode to D95 ratio of 0.634 and having a volume percent particle size of 32 microns. The powder that passed through the sieve was captured from the air stream with a cyclone (such as the GAZ 125 High Efficiency Cyclone available from Hosokawa Micron, Summit N.J.).

Comparative Example 1 had a roughness of 3.8 microns (with a film thickness of 75 microns), electrostatics of 1.16 g, and exhibited bed channels and falling during fluidization.

Example 1

PFA X 6502TA (available from Dyneon LLC Oakdale, Minn.) was mechanically compacted by placing 60 to 90 grams of PFA into a 7.62 cm diameter cylindrical compression mold. A compressive force of 670 KN was applied for 10 seconds to form a cylindrical disk (refer to U.S. Pat. No. 4,312,961). The disks were broken and fed into a Strand S104 Hammer mill, from Strand Manufacturing Inc. Hopkins, Minn., using s 4 mesh screen to obtain a coarse powder. The coarse powder was milled on a Hosokawa ACM1 mill from Hosokawa Micron, Summit, N.J. with the following settings. Airflow was set to 20 in $H_2O$ (4900 pascals) and mill speed to 10,000 RPM. The classifier speed was set to 3500 RPM.

The resulting powder was measured to have a volume percent particle size of 51 µm on a Malvern Mastersizer/E.

The powder was then sieved at 53 microns with a Hosokawa Micron Air Jet Sieve (available from Hosokawa Micron, Summit, N.J.). The resulting powder had a 41 micron volume percent particle size and a mode to D95 ratio of 0.872. The powder that passed through the sieve was captured from the air stream with a cyclone (such as the GAZ 125 High Efficiency Cyclone available from Hosokawa Micron, Summit N.J.).

Example 1 had a roughness of 4.1 microns (with a film thickness of 75 microns), electrostatics of 1.56 g, and displayed a boiling fluid bed with only slight geysering around the perimeter of the fluid bed during fluidization.

Example 2

FEP X 6315A available from Dyneon LLC, Oakdale, Minn. was mechanically compacted by placing 60 to 90 grams of FEP into a 7.62 cm diameter cylindrical compression mold. A compressive force of 670 KN was applied for 10 seconds to form a cylindrical disk (refer to U.S. Pat. No. 4,312,961). The disks were broken and fed into a Strand S104 Hammer mill, from Strand Manufacturing Inc. Hopkins, Minn., using a 4 mesh screen to obtain a coarse powder. The coarse powder was milled on a Hosokawa ACM1 mill manufactured by Hosokawa Micron, Summit N.J. with the following settings. Airflow was 20 in $H_2O$ (4900 Pascals), the mill speed was 17,000 RPM and the classifier speed was 4000 RPM.

The particle size was measured on a Malvern Mastersizer/E (available from Worcestershire, United Kingdom) using octanol as the carrier. The resultant volume percent particle size was 41 microns.

The powder was then sieved at 53 microns with a Hosokawa Micron Air Jet sieve (available from Hosokawa Micron, Summit, N.J.). The sieved powder had a volume percent particle size of 33 microns. The powder that passed through the sieve was captured from the air stream with a cyclone (such as the GAZ 125 High Efficiency Cyclone available from Hosokawa Micron, Summit N.J.).

Example 2 had mode to D95 ratio of 0.908, a roughness of 2.0 microns (with a film thickness of 75 microns), electrostatics of 1.33 g, and displayed a boiling fluid bed with only slight geysering around the perimeter of the fluid bed during fluidization.

Example 3

ETFE reactor powder made by aqueous emulsion polymerization (tetrafluoroethylene (TFE) 52.2 mol %; ethylene 45.0 mol %; perfluoro(propyl vinyl) ether 1.0 mol % (PPVE); hexafluoropropylene 1.8 mol % (HFP)) was mechanically compacted. Mechanically compacted samples of ETFE were broken and fed into a Strand S104 Hammer mill (available from Strand Manufacturing Inc. Hopkins, Minn.) using a 4 mesh screen to obtain a coarse powder. The coarse powder was milled on a Hosokawa ACM1 manufactured by Hosokawa Micron, Summit N.J. with the following settings. The airflow was set to 20 in $H_2O$ (4900 Pascals), the mill speed was 17,000 RPM and the classifier speed was 5000 RPM. The resultant volume percent particle size was 45 microns.

The powder was then sieved at 53 microns with a Hosokawa Micron Air Jet sieve (available from Hosokawa Micron, Summit, N.J.). The sieved powder had a volume percent particle size of 28 microns. The powder that passed through the sieve was captured from the air stream with a cyclone (such as the GAZ 125 High Efficiency Cyclone available from Hosokawa Micron, Summit N.J.).

Example 3 had a mode to D95 ratio of 0.845, a roughness of 1.7 microns (with a film thickness of 75 microns), electrostatics of 1.21 g, and showed geysering in the bed but no channelling during fluidization.

Example 4

PFA reactor powder PFA 6502TA (available from Dyneon LLC, Oakdale, Minn.) was mechanically compacted and coarse milled as described in Example 3. The coarse powder was milled on a Hosokawa ACM1 manufactured by Hosokawa Micron, Summit N.J. with the following settings. The airflow was set to 20 in $H_2O$ (4900 Pascals), the mill speed was 12,000 RPM and the classifier speed was 4500 RPM.

The particle size was measured on a Malvern Mastersizer/E from Worcestershire United Kingdom using octanol as the carrier. The resultant volume percent particle size was 55 microns.

The powder was then sieved at 74 microns with a Hosokawa Micron Air Jet sieve (available from Hosokawa Micron, Summit, N.J.). The sieved powder had a volume percent particle size of 48 microns. The powder that passed through the sieve was captured from the air stream with a cyclone (such as the GAZ 125 High Efficiency Cyclone available from Hosokawa Micron, Summit N.J.). The sieved powder was measured on a Malvern Mastersizer/E to have a volume percent particle size of 48 µm.

Example 4 had a mode to D95 ratio of 0.851, a roughness of 4.1 microns (with a film thickness of 125 microns), electrostatics of 1.76 g, and displayed a boiling fluid bed with only slight geysering around the perimeter of the fluid bed during fluidization.

Example 5

PFA reactor powder PFA 6502TA (available from Dyneon LLC, Oakdale, Minn.) was mechanically compacted and coarse milled as described in Example 3. The coarse powder was milled on a Hosokawa ACM1 manufactured by Hosokawa Micron, Summit N.J. with the following settings. The airflow was set to 20 in $H_2O$ (4900 Pascals), the mill speed was 13,000 RPM and the classifier speed was 5000 RPM.

The particle size was measured on a Malvern Mastersizer/E from Worcestershire United Kingdom using Octanol as the carrier. The resultant volume percent particle size was 40 microns.

The powder was then sieved at 45 microns with a Hosokawa Micron Air Jet sieve (available from Hosokawa Micron, Summit, N.J.). The sieved powder had a volume percent particle size of 34 microns. The powder that passed through the sieve was captured from the air stream with a cyclone (such as the GAZ 125 High Efficiency Cyclone available from Hosokawa Micron, Summit N.J.).

Example 5 had a roughness of 2.5 microns (with a film thickness of 50 microns), electrostatics of 1.18 g, and displayed a boiling fluid bed with only slight geysering around the perimeter of the fluid bed during fluidization.

The physical properties of the polymers described in Examples 1 through 5 are summarized immediately below in Table 2.

TABLE 2

| Example | Mode | D95 | Ratio of Mode to D95 | Film Thickness (μm) | Roughness (Ra in μm) | Electrostatics (weight gain in grams) | Fluidization |
|---|---|---|---|---|---|---|---|
| Comp Ex 1 | 39.81 | 64.74 | 0.624 | 75 | 3.8 | 1.16 | ↘ |
| Example 1 | 45.79 | 52.51 | 0.872 | 75 | 4.1 | 1.56 | ↗ |
| Example 2 | 46.10 | 50.70 | 0.908 | 75 | 2.0 | 1.33 | ↗ |
| Example 3 | 39.02 | 46.20 | 0.845 | 75 | 1.7 | 1.21 | NA |
| Example 4 | 56.74 | 66.68 | 0.851 | 125 | 3.6 | 1.76 | ↗ |
| Example 5 | 48.86 | 62.82 | 0.778 | 50 | 2.5 | 1.18 | → |

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

We claim:

1. A composition comprising a fluoropolymer with a particle size distribution having a ratio of the mode to D95 of 0.75 or greater, wherein the fluoropolymer has less than 60 unstable endgroups per million carbon atoms when the fluoropolymer is a copolymer consisting of interpolymerized units derived from tetrafluoroethylene and perfluoro (propyl vinyl) ether.

2. The composition of claim 1 wherein the fluoropolymer is derived from units of tetrafluoroethylene, hexafluoropropylene, vinylidene fluoride, ethylene, propylene, fluorovinylethers, perfluorovinylethers or combinations thereof.

3. The composition of claim 1 wherein the fluoropolymer has a melt flow index according to ASTM D1238 of from about 2 to about 8.

4. The composition of claim 1 wherein the fluoropolymer has a volume percent particle size of 75 microns or less.

5. The composition of claim 1 wherein the fluoropolymer has less than 20 unstable endgroups per million carbon atoms.

6. The composition of claim 1 wherein the fluoropolymer is essentially free of unstable endgroups.

7. The composition of claim 1 wherein the powder displays improved fluidization properties compared to a powder having a mode to D95 ratio of less than 0.75.

8. A coated article comprising a fluoropolymer layer of the composition of claim 1 and a substrate, wherein the coated article has a surface roughness as measured by $R_a$ of 3 microns or less.

9. A coated article according to claim 8 wherein the substrate is metal or coated metal.

10. A coated ankle according to claim 8 wherein the composition is electrostatically applied to the substrate.

* * * * *

UNITED STATES PATENT AND TRADEMARK OFFICE
CERTIFICATE OF CORRECTION

PATENT NO. : 7,342,081 B2  Page 1 of 1
APPLICATION NO. : 11/024131
DATED : March 11, 2008
INVENTOR(S) : Blake E. Chandler It is certified that error appears in the above-identified patent and that said Letters Patent is hereby corrected as shown below:

Column 4
Line 11, after "fluoropolymer" insert -- . The --.
Lines 36-39, delete the sentence "The utilization of...of the composition." And insert the same on line 35 after "nitrogen." as a continuation of the same paragraph.

Column 6
Line 31, delete "phloroglucinaol," and insert -- phloroglucinol, --, therefor.
Line 32, delete "5-dihydroxynaphalene" and insert -- 5-dihydroxynapthalene --, therefor.

Column 7
Line 33, delete "z,900" and insert -- ↗ --, therefor.
Line 35, delete "z,901" and insert -- → --, therefor.
Line 36, delete "z,902" and insert -- ↘ --, therefor.

Column 8
Line 32, delete "s" and insert -- a --, therefor.
Line 62, delete "s" and insert -- a --, therefor.

Signed and Sealed this

Nineteenth Day of August, 2008

JON W. DUDAS
*Director of the United States Patent and Trademark Office*